United States Patent [19]

Marshall

[11] 4,451,017

[45] May 29, 1984

[54] THREE STAGE ROCKET VEHICLE WITH PARALLEL STAGING

[75] Inventor: William R. Marshall, Madison, Ala.

[73] Assignee: The United States of America as represented by the Administrator, National Aeronautics and Space Administration, Washington, D.C.

[21] Appl. No.: 431,886

[22] Filed: Sep. 30, 1982

[51] Int. Cl.³ .............................................. B64G 1/40
[52] U.S. Cl. ...................................... 244/172; 244/2; 244/63
[58] Field of Search ...................... 244/74, 158 R, 160, 244/162, 172, 2, 63; D22/11; 60/205, 224, 225, 245, 251; 102/347, 352, 374, 377, 378, 381

[56] References Cited

U.S. PATENT DOCUMENTS 3,369,771  2/1968  Walley et al. ........................ 244/162
3,866,863  2/1975  von Pragenau ...................... 244/162
3,929,306  12/1975 Faget et al. .......................... 244/162

Primary Examiner—Trygve M. Blix
Assistant Examiner—Rodney Cori
Attorney, Agent, or Firm—Leon D. Wofford, Jr.; John R. Manning; Joseph H. Beumer

[57] ABSTRACT

A three stage rocket vehicle (11) having a large forward propellant tank (12) and a small aft propellant tank (13) axially aligned. Secured to the rear end of the aft propellant tank (13) is an engine mount structure (14) carrying rocket engines (15). Offset and secured to the propellant tanks (12,13) is a payload structure (18). The propellants from the large forward tank (12) are fed into the aft propellant tank (13) and the rocket engines (15) are fed propellants from the aft propellant tank (13). This arrangement enables the vehicle to parallel stage its use of engines and components.

5 Claims, 6 Drawing Figures

THREE STAGE ROCKET VEHICLE WITH PARALLEL STAGING

ORIGIN OF THE INVENTION

The invention described herein was made by an employee of the United States Government and may be manufactured and used by or for the Government of the United States of America for Governmental purposes without the payment of any royalties thereon or therefor.

DESCRIPTION

1. Technical Field

The invention relates to rocket spacecraft adapted to be launched from earth, and particularly to a three stage rocket launch vehicle having parallel staging of some components during both stage-one and stage-two.

2. Background Art

The space shuttle is now a proven space transportation system in which space crews will use the spacecraft orbiter again and again in launches from the earth. The shuttle is composed of a cluster arrangement of the orbiter with its three main rocket engines, a large external tank that carries the propellants for the orbiter's main engines and two solid rocket boosters.

The space shuttle during launch has the large external tank at its center, the two solid rocket boosters on opposite sides of the external tank, and the orbiter on the third side of the external tank. During the first stage of the launch, the two solid rocket boosters and the three main rocket engines on the orbiter are fired together to accomplish the liftoff from earth. The first stage ends upon the depletion of the solid rocket boosters and their separation from the external tank for later recovery. The second stage is accomplished by having the three main rocket engines continue to burn from the propellants in the external tank, thus in the first two stages the main rocket engines are utilized in parallel. Following depletion of the propellants in the external tank, the orbiter's attachments to the external tank are explosively severed to allow the external tank to be discarded.

It is recognized as discussed in copending patent application Ser. No. 418,138, filed on Sept. 15, 1982, and assigned to the U.S. Government as represented by the National Aeronautics and Space Administration, that by inverting the forward and aft pressure vessels of the external tank enables structural weight reductions to be accomplished and corresponding increases in payload capacity.

BRIEF DESCRIPTION OF THE INVENTION

While two stage to orbit features of the space shuttle are useful in accomplishing various low earth orbit space missions, the gross payload of the orbiter is limited. It is the purpose of the present invention to accomplish significant increase in low orbit payloads and permit access to higher orbits by adding a third stage to launch vehicles based on the major components of the space shuttle including the orbiter.

The rocket launch vehicle of the present invention will have a forward propellant tank, which corresponds to the external tank of the space shuttle (but having inverted hydrogen and oxygen pressure vessels), a small aft propellant tank, axially aligned and secured to the large propellant tank, and an engine mount structure carrying at least one rocket engine secured to the rear of the small aft propellant tank. Above and secured to the propellant tanks is a payload structure which may be the space shuttle orbiter. A pair of solid rocket boosters are severably secured to opposed sides of the propellant tanks.

The propellants from the large forward tank are fed into the aft propellant tank and the main rocket engines are fed propellants from the aft propellant tank. This arrangement enables the rocket launch vehicle according to the present invention to parallel stage its use of engines and components.

At the launch of the rocket vehicle, the solid rocket boosters and all main engines will be firing simultaneously. This stage continues until the depletion of solid rocket boosters at which time the boosters are jettisoned. At stage two, all main engines continue to fire until the large propellant tank is empty at which time it is severed and jettisoned. At the time of jettisoning of the large propellant tank, a group of main engines and its supporting structure could also be jettisoned from the rear structure attached to the aft small propellant tank. Thus, the third stage for placing the payload structure or orbiter into orbit is accomplished by the propellant from the small aft tank supplying at least one of the remaining main rocket engines.

It is an object of the present invention to provide efficient staging of rocket launch vehicles by utilizing propellant tanks that feed through each other.

Another object is to provide a rocket launch vehicle based on space shuttle components that will significantly increase payload capability and access to higher orbits with only a slight increase in vehicle weight.

DETAILED DESCRIPTION OF THE INVENTION

Figure 1:
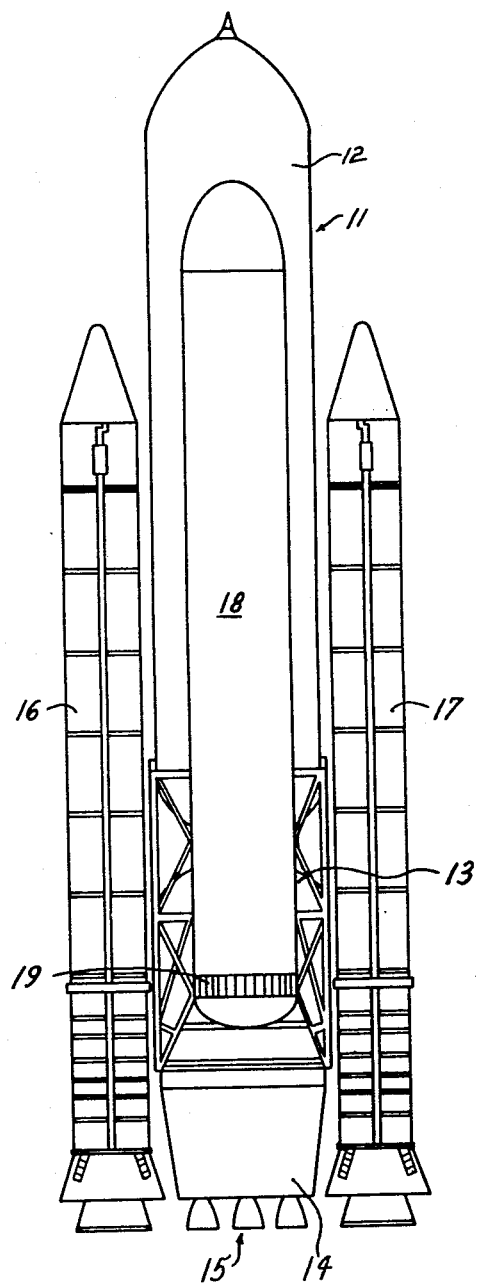
FIG. 1 is a side view of the three stage rocket vehicle according to the present invention.

Referring to the drawings, there is shown in FIG. 1 a three-stage rocket vehicle 11 composed of two aligned propellant tanks 12, 13 secured together and having a rear structure 14 carrying a group of four main rocket engines 15, two solid rocket boosters 16, 17 secured to opposed sides of the propellant tanks, and a payload structure 18 with a surrounding shroud secured to a third side of the propellant tanks 12, 13 and parallel thereto. An electronic instrument unit 19 is carried by the payload structure 18 for providing on-board control and command of the vehicle 11.

Figures 2, 3:
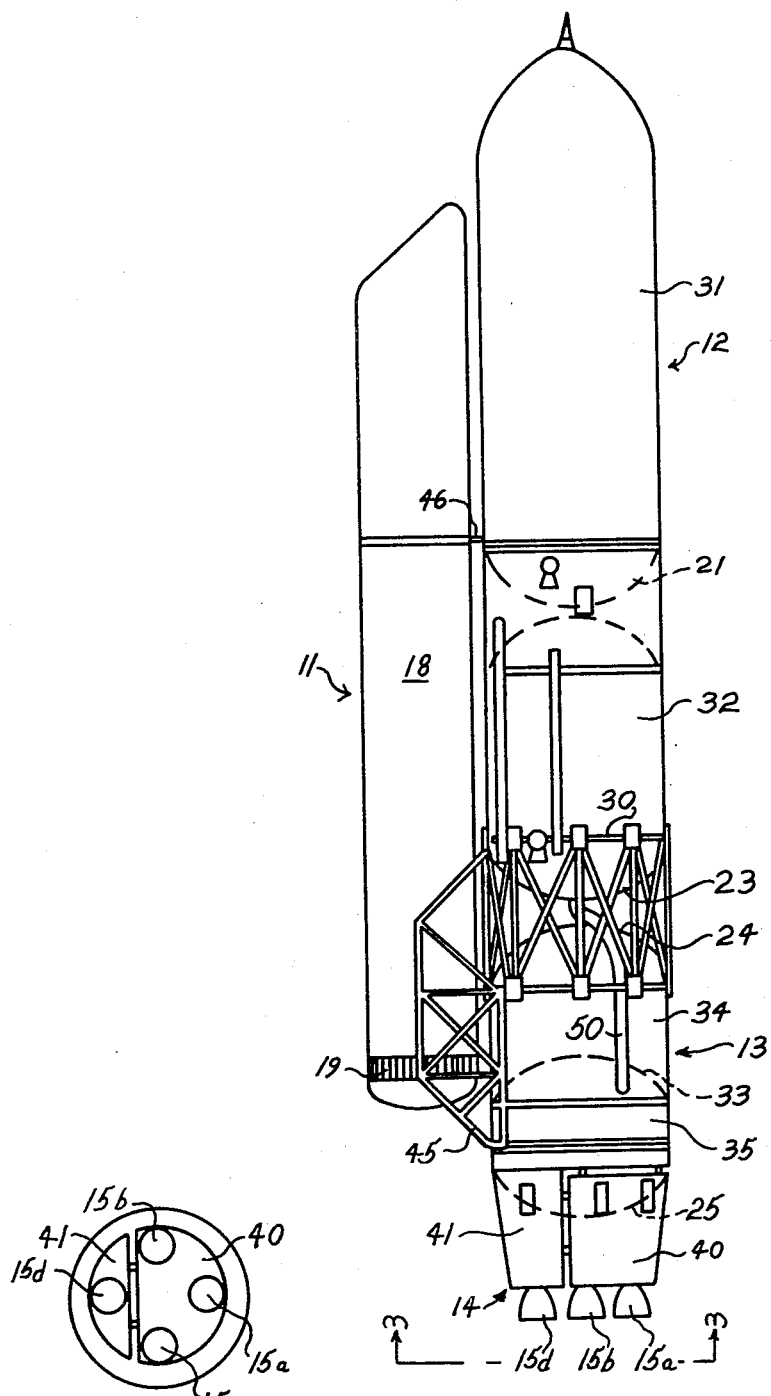
FIG. 2 is a side view showing the second-stage components of the rocket vehicle of FIG. 1.
FIG. 3 is an end view of the main engine grouping of the rocket vehicle of FIG. 1.

Referring to FIG. 2, which illustrates stage-two components of the vehicle 11 following the removal of the solid rocket boosters 16, 17 of FIG. 1, it can be seen that the forward propellant tank 12 and the aft propellant tank 13 are cylindrical and have dome end structures 21, 22, 23, 24 and 25, and are aligned and secured to each other by an interstage framework structure 30. The forward propellant tank is severably secured by explosive bolts or similar means to the interstage structure 30 so as to be severed on command.

The forward propellant tank 12 is similar to that used for the space shuttle but having its lighter hydrogen pressure vessel 31 in front and its heavier oxygen pressure vessel 32 in rear. The small aft propellant tank 13 has the same cylindrical diameter as the forward tank 12 and utilizes the same type dome structures. Rather than have two separate vessels, the aft tank utilizes a dome 33 which serves as a common bulkhead to form the necessary compartment vessel for the propellants. The forward vessel 34 holds liquid hydrogen and the rear vessel 35 holds liquid oxygen.

The rear engine mount structure 14 secured to the rear of the small aft propellant tank 13 supports the main rocket engines 15 and their necessary operating components. However, the engine mount structure 14 has two distinct parts for staging and allowing the jettisoning of one part and its main rocket engines. As shown, the lower part 40 is severable on command and it carries a grouping of three main rocket engines 15a, 15b, and 15c, as shown in FIG. 3. The upper part 41 is not severable and it carries a single main rocket engine 15d.

A truss framework structure 45 is secured to the aft propellant tank 13 and the intertank structure 30, and the truss 45 supports the elongated payload structure 18 that is suitably shrouded and parallel to the propellant tanks 12, 13. A severable attach 46 between the payload structure 30 and forward propellant tank 12 provides for additional rigidity during stage one and stage-two ascent.

Figure 4:
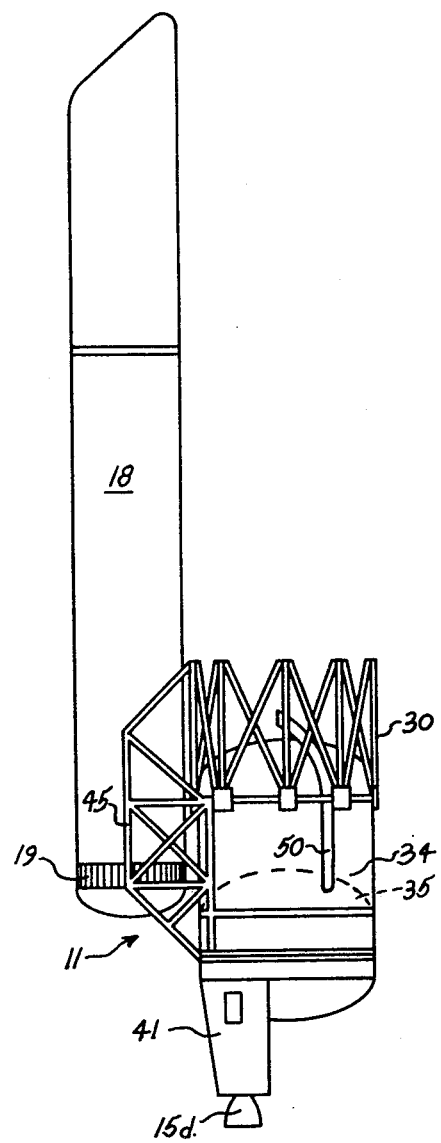
FIG. 4 is a side view showing the third stage components of the rocket vehicle of FIG. 1.

FIG. 4 shows the stage-three components of the vehicle 11 following the severance and removal of the forward propellant tank, and a portion of the engine mount structure 41.

Figure 5:
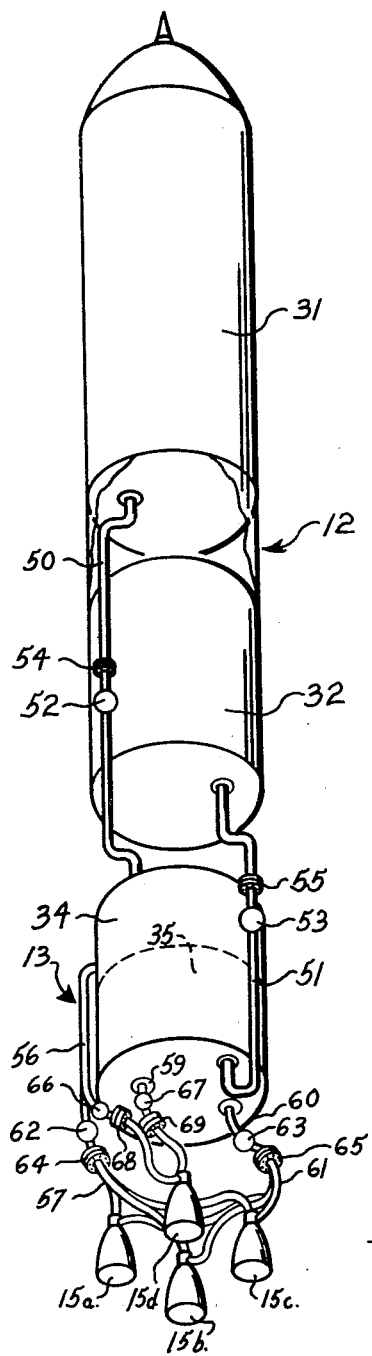
FIG. 5 is a schematic of the propellant feed system.

The propellant feed system is represented in FIG. 5. The forward propellant tank 12 is illustrated with its forward pressure vessel 31 for carrying liquid hydrogen and its aft pressure vessel 32 for carrying liquid oxygen. Similarly, the aft propellant tank 13 is illustrated with its forward compartment or vessel 34 for carrying liquid hydrogen and its aft compartment or vessel 35 for carrying liquid oxygen. Two pipes 50, 51 are provided to communicate the tank structures for carrying liquid hydrogen and liquid oxygen, respectively. Both pipes are provided with on-command shut-off valves 52, 53 and flange joints 54, 55 that are held together with bolts that may be explosively severed on command.

An exit pipe 56 from the forward compartment of vessel 34 of the aft propellant tank, supplies the hydrogen therein to the single main rocket engine 15d of the fixed engine mount structure and to a manifold 57 for supplying the group of three main rocket engines 15a, 15b, 15c, of the severable engine mount structure. A pair of exit pipes 59, 60 from the rear compartment or vessel 35 of the aft propellant tank supplies oxygen respectively to the single main rocket engine 15d of the fixed mount structure and to the manifold 51 for the group of three main engines 15a, 15b, and 15c on the severable mount structure. Both pipes 59, 60 supplying the manifolds are provided with on-command shut-off valves 62, 63 and flange joints 64, 65 that are held together with bolts that may be explosively severed on command so that portion of the engine mount structure may be severed and jettisoned at the end of stage-two.

Engine 15d continues to fire during stage-three using propellants from vessels 34 and 35. The engine valve 66 for the hydrogen line, and valve 67 for the oxygen line are closed at the end of stage-three. Propellant line disconnects 68 and 69 are also provided for engine 15d.

At the start of ascent, the solid rocket boosters 16, 17 and four main rocket engines 15a, 15b, 15c, 15d, are firing simultaneously and that stage is completed when the solid rocket boosters 16, 17 are depleted and severed from the propellant tanks 12, 13. For stage-two the four main rocket engines 15a, 15b, 15c, 15d continue to fire until the forward propellant tank 12 is empty at which time the valves 52, 53 between the forward and aft propellant tanks are closed and the lines 50, 51 are severed, and the forward propellant tank 12 is severed by suitable explosive devices from the intertank structural framework 30 and jettisoned forward and aside. At this same time, the propellant shut-off valves 62, 63 to the severable engine mount structure 40 are closed and that structure together with its three main rocket engines 15a, 15b, 15c, are severed and jettisoned aside. At stage-three, the single main rocket engine 15d continues to fire from the propellants in the aft propellant tank 13 so as to place the remaining components of FIG. 4 in the desired orbit.

The propellant feed system is efficient in that it is used for all the main rocket engines and permits the discarding of propellant tanks when empty.

While not illustrated, the aft engine mount structure could have only three main rocket engines with the severable portion carrying two main rocket engines. However, payload will be decreased, but for cost reasons this may be an attractive modification.

Figure 6:
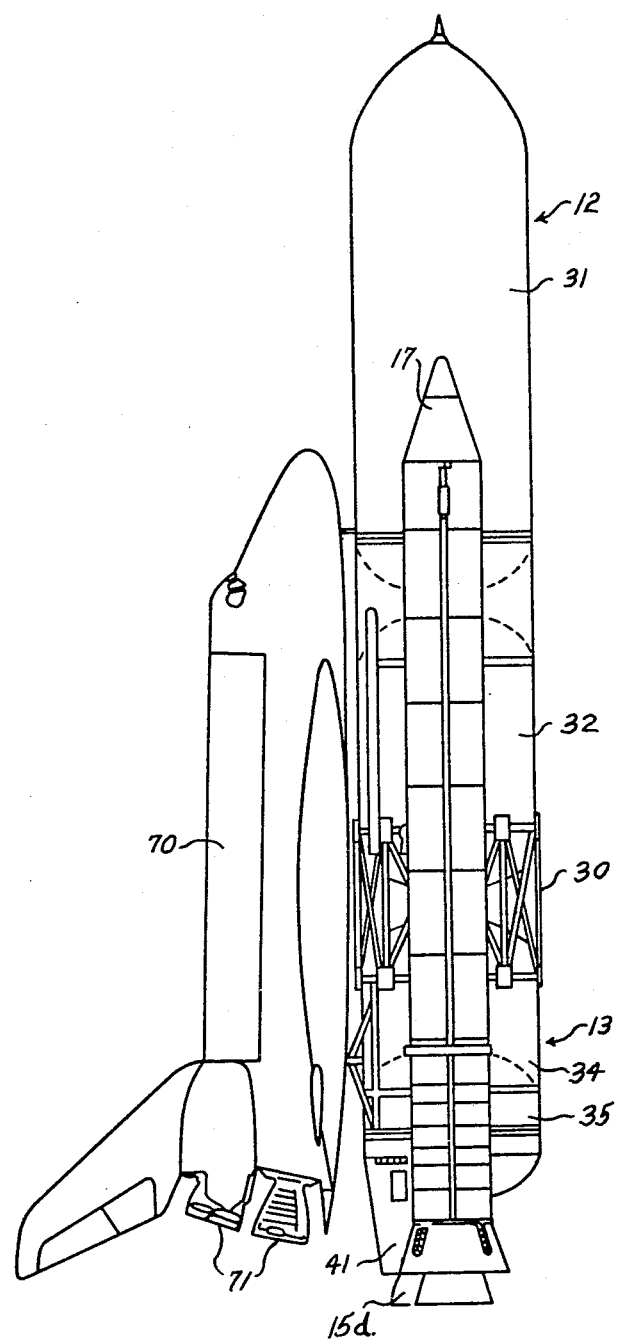
FIG. 6 is a side view showing a modification utilizing the space shuttle orbiter.

As illustrated in FIG. 6, the space shuttle orbiter 70 could replace the payload structure. In this application, the orbiter's three main rocket engines 71 would be used rather than the three main engines associated with severable portion of the rear engine mount structure. The single main engine 15d of the fixed portion of the engine mount structure 41 could be used as an option to obtain four main rocket engines, and for single main engine firing during stage-three.

While the invention has been described relative to specific embodiments, it is evident that modifications and changes may be made with regard thereto without departing from the scope of the invention.

I claim:

1. A three-stage rocket launch vehicle having a propellant feed system from a forward tank stage to an aft tank stage, comprising:

axially aligned forward and aft tanks for carrying propellants for rocket engines;

an intertank structure fixedly joined to the front portion of said aft tank and severably joined to the rear portion of said forward tank;

an engine mount structure secured to the rear portion of said aft propellant tank;

at least one rocket engine supported by said engine mount structure;

a pair of solid rocket boosters secured to opposed sides of said forward and aft propellant tanks;

said forward propellant tank having a front pressure vessel for carrying hydrogen and a rear pressure vessel for carrying oxygen;

said aft tank having a front pressure vessel for carrying hydrogen and a rear pressure vessel for carrying oxygen;

a first pipe line communicating said front pressure vessels, and a second pipe line communicating said rear pressure vessels for feeding propellants from the front pressure vessels to said rear pressure vessels as propellant is provided from said rear pressure vessels to said at least one rocket engine;

each said first and second pipe lines having on-command shut-off valves and joint means for severing the pipe line on-command;

third and fourth pipe lines communicating, respectively, said forward vessel and said rear vessel of said aft propellant tank with said at least one rocket engine supported by said engine support structure; and an elongated payload structure severably fixed to the third side of said forward propellant tank and fixed to the third side of said aft propellant tank, said payload structure extending parallel to said forward and said aft propellant tanks.

2. A three-stage rocket launch vehicle according to claim 1, wherein:

said engine mount structure has a first part fixed to the rear portion of said aft propellant tank, and a second part severably secured to said aft propellant tank;

a plurality of main rocket engines supported by said second part of the engine mount structure and a single main rocket engine supported by said first part of the engine mount structure.

3. A three-stage rocket launch vehicle according to claim 1 wherein:

said payload carrying structure is a spacecraft having three main rocket engines and the propellant of said aft propellant tank is also fed to said three main rocket engines of the spacecraft.

4. A method of placing a three-stage rocket launch vehicle according to claim 2 in orbit, comprising:

at stage-one, firing said pair of solid rocket boosters and said plurality of main rocket engines until the depletion of said solid rocket boosters and then jettisoning said solid rocket boosters aside;

at stage-two firing said main rocket engines until the depletion of said forward propellant tank and then jettisoning said forward propellant tank, and said second part of said engine mount structure with its said plurality of main rocket engines;

at stage-three, continuing to fire said single main rocket engine supported by said first part of the engine mount structure utilizing the propellant from the aft propellant tank so as to place the remaining vehicle components into orbit.

5. A method of placing a three-stage rocket launch vehicle according to claim 3 in orbit, comprising:

at stage-one, firing said pair of solid rocket boosters and said three main rocket engines and said at least one rocket engine until the depletion of said solid rocket boosters, and then jettisoning said solid rocket boosters aside;

at stage-two firing said three main rocket engines and said at least one rocket engine until depletion of said forward propellant tank, and then jettisoning said forward propellant tank aside, and shutting off said three main engines on said spacecraft;

at stage-three, continuing to fire said at least one rocket engine supported by said engine mount structure utilizing the propellant from the aft propellant tank until orbit of the remaining vehicle components is achieved.

* * * * *